US009172707B2

(12) United States Patent
Spektor (10) Patent No.: US 9,172,707 B2
(45) Date of Patent: Oct. 27, 2015

(54) REDUCING CROSS-SITE SCRIPTING ATTACKS BY SEGREGATING HTTP RESOURCES BY SUBDOMAIN

(75) Inventor: Daron Spektor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1631 days.

(21) Appl. No.: 11/959,479

(22) Filed: Dec. 19, 2007

(65) Prior Publication Data

US 2009/0165124 A1 Jun. 25, 2009

(51) Int. Cl.
G06F 21/30 (2013.01)
H04L 29/06 (2006.01)

(52) U.S. Cl.
CPC ........... *H04L 63/104* (2013.01); *H04L 63/0807* (2013.01)

(58) Field of Classification Search
CPC .......................... H04L 63/0807; H04L 63/104
USPC .......................................................... 726/21
See application file for complete search history.

(56) References Cited

U.S. PATENT DOCUMENTS

| 5,966,441 | A | * | 10/1999 | Calamera | 713/167 |
| 6,625,594 | B1 | * | 9/2003 | Rolland et al. | 1/1 |
| 6,643,707 | B1 | * | 11/2003 | Booth | 709/245 |
| 6,751,736 | B1 | * | 6/2004 | Bowman et al. | 713/189 |
| 6,910,041 | B2 | | 6/2005 | Exton et al. | |
| 6,944,777 | B1 | | 9/2005 | Belani et al. | |
| 7,031,954 | B1 | | 4/2006 | Kirsch | |
| 7,065,784 | B2 | | 6/2006 | Hopmann et al. | |
| 7,092,942 | B2 | | 8/2006 | Frieden et al. | |
| 7,127,608 | B2 | * | 10/2006 | Royer et al. | 713/162 |
| 7,140,039 | B1 | * | 11/2006 | Yemeni et al. | 726/9 |
| 7,191,216 | B2 | | 3/2007 | Mattila et al. | |
| 7,194,764 | B2 | * | 3/2007 | Martherus et al. | 726/8 |
| 7,200,599 | B2 | | 4/2007 | Simon et al. | |
| 7,248,691 | B1 | | 7/2007 | Pandit et al. | |
| 7,299,491 | B2 | * | 11/2007 | Shelest et al. | 726/4 |
| 7,310,813 | B2 | * | 12/2007 | Lin et al. | 726/3 |
| 7,533,157 | B2 | * | 5/2009 | Hu et al. | 709/219 |
| 7,552,464 | B2 | * | 6/2009 | Turner et al. | 726/3 |

(Continued)

OTHER PUBLICATIONS

Wikipedia, the free encyclopedia. Oct. 25, 2007. Definition of Cross-site scripting. http://en.wikipedia.org/wiki/cross-site_scripting.

(Continued)

*Primary Examiner* — Saleh Najjar
*Assistant Examiner* — Oleg Korsak
(74) *Attorney, Agent, or Firm* — Bryan Webster; Timothy Churna; Micky Minhas (57) ABSTRACT

An arrangement for reducing the occurrence of harmful cross-site scripting is provided by segregating on-line content or other resources so that they are accessible at different domains or subdomains, each of which corresponds to a set of users, called a "sharing set," where each user in the set has identical access privileges to certain resources. The sharing set is provided with an identifier (which may or may not be unique), so that the identifier may be used as the name of the domain or subdomain for which any member of the sharing set is authorized to access the resources located there. In this way, script that is embedded with the content can only be executed among members of the sharing set. Users who are not members of the sharing set are unable to invoke cross site-scripting attacks that would allow them to gain access to data from sharing set members.

20 Claims, 5 Drawing Sheets

(56) References Cited

U.S. PATENT DOCUMENTS

| | | | |
|---|---|---|---|
| 7,673,329 B2* | 3/2010 | Hui Hsu et al. | 726/6 |
| 7,792,834 B2* | 9/2010 | Sorensen | 707/736 |
| 7,873,661 B2* | 1/2011 | Schulke | 707/783 |
| 2001/0020228 A1* | 9/2001 | Cantu et al. | 705/1 |
| 2001/0047395 A1* | 11/2001 | Szutu | 709/217 |
| 2001/0056494 A1 | 12/2001 | Trabelsi | |
| 2002/0029237 A1* | 3/2002 | Shibata et al. | 709/1 |
| 2002/0077846 A1* | 6/2002 | Bierbrauer et al. | 705/1 |
| 2002/0095567 A1* | 7/2002 | Royer et al. | 713/150 |
| 2002/0138354 A1* | 9/2002 | Seal et al. | 705/26 |
| 2002/0162002 A1 | 10/2002 | Gunter et al. | |
| 2002/0188606 A1* | 12/2002 | Sun et al. | 707/10 |
| 2003/0114171 A1* | 6/2003 | Miyamoto | 455/456 |
| 2003/0177236 A1* | 9/2003 | Goto et al. | 709/225 |
| 2004/0064334 A1* | 4/2004 | Nye | 705/1 |
| 2004/0103200 A1 | 5/2004 | Ross et al. | |
| 2004/0122946 A1* | 6/2004 | Hu et al. | 709/225 |
| 2004/0172268 A1* | 9/2004 | Franklin et al. | 705/1 |
| 2004/0230820 A1* | 11/2004 | Hui Hsu et al. | 713/200 |
| 2004/0260754 A1 | 12/2004 | Olson et al. | |
| 2005/0071641 A1 | 3/2005 | Basibes et al. | |
| 2005/0076132 A1* | 4/2005 | Roberts et al. | 709/228 |
| 2005/0092827 A1* | 5/2005 | Cimino | 235/380 |
| 2005/0120211 A1* | 6/2005 | Yokoyama | 713/168 |
| 2005/0154600 A1* | 7/2005 | Feygenson et al. | 705/1 |
| 2005/0177455 A1* | 8/2005 | De Lury et al. | 705/26 |
| 2005/0216467 A1 | 9/2005 | Urakawa et al. | |
| 2005/0240658 A1* | 10/2005 | Schulke | 709/217 |
| 2006/0009197 A1* | 1/2006 | Chiba et al. | 455/411 |
| 2006/0031298 A1* | 2/2006 | Hasegawa | 709/206 |
| 2006/0036748 A1* | 2/2006 | Nusbaum et al. | 709/228 |
| 2006/0090001 A1* | 4/2006 | Collins | 709/230 |
| 2006/0143307 A1* | 6/2006 | Codignotto | 709/246 |
| 2006/0174322 A1* | 8/2006 | Turner et al. | 726/3 |
| 2006/0195405 A1* | 8/2006 | Miura et al. | 705/65 |
| 2006/0248577 A1* | 11/2006 | Beghian et al. | 726/5 |
| 2007/0005595 A1 | 1/2007 | Gafter | |
| 2007/0107057 A1 | 5/2007 | Chander et al. | |
| 2007/0107059 A1* | 5/2007 | Chasin et al. | 726/23 |
| 2007/0156691 A1 | 7/2007 | Sturms et al. | |
| 2007/0219871 A1* | 9/2007 | Rolf et al. | 705/26 |
| 2007/0244974 A1* | 10/2007 | Chasin | 709/206 |
| 2007/0253553 A1* | 11/2007 | Abdul Rahman | 380/259 |
| 2008/0082416 A1* | 4/2008 | Kotas et al. | 705/14 |
| 2008/0228675 A1* | 9/2008 | Duffy et al. | 706/10 |
| 2009/0157685 A1* | 6/2009 | Sorensen | 707/9 |
| 2009/0199000 A1* | 8/2009 | Hsu et al. | 713/162 |

OTHER PUBLICATIONS

Wikipedia, the free encyclopedia. Oct. 25, 2007. Definition of HTTP cookie. http://en.wikipedia.org/wiki/HTTP_cookie.

"Access Control List Access Authorization", http://publib.boulder.ibm.com/infocenter/pseries/v5r3/index.jsp?topic=/com.ibm.aix.baseadmn/doc/baseadmndita/acl_access_auth.htm, Dec. 17, 2007.

Anne Van Kesteren, "Enabling Read Access for Web Resources", Oct. 1, 2007 http://www.w3.org/TR/access-control/.

Clemm, et al., "Web Distributed Authoring and Versioning (WebDAV) Access Control Protocol", Date: May 2004, http://www.ietf.org/rfc/rfc3744.txt.

* cited by examiner

REDUCING CROSS-SITE SCRIPTING ATTACKS BY SEGREGATING HTTP RESOURCES BY SUBDOMAIN

BACKGROUND

The Internet, which includes a large number of networked computers distributed throughout the world, has become an extremely popular source of virtually all kinds of information. Increasingly sophisticated computers, software, and networking technology have made Internet access relatively straightforward for end users. For example, conventional browser software allows a user to request information or items such as a web page from a network location such as a web site on one or more remote computers. To this end, the user provides the address of the web page (e.g., a uniform resource locator, or "URL") in some manner to the browser software, and the browser software transmits the request using a communication protocol such as HTTP (HyperText Transport Protocol). The request is then routed to the destination computer or web site based on the address.

When the request is received, the remote web site evaluates the request and returns an appropriate response, which may include the information requested in some formatted content, for example using HTML (HyperText Markup Language). The browser software parses and interprets the returned content to render a page or pages of content on the user's computer display.

When accessed, some web sites attempt to store information on the user's computer, in a small text file referred to as a cookie. Cookies provide for HTTP state management, by which a server may correlate multiple requests coming from the same client. Many times this is desirable to the user, for example, so that the user does not have to repeatedly resubmit information manually to the remote computer hosting the web site, but instead can automatically provide the information as stored in the cookie.

For example, a user can allow cookies to be stored on his or her computer so as to be able to view some web sites, and/or to take advantage of desirable customization features, such as local news and weather, or stock quotes. As can be appreciated, cookies may include sensitive and personal information, or the keystrokes needed to get to a user's sensitive and personal information. For example, a cookie may be used as an authenticator where a cookie may contain a ticket that grants the user access to some restricted resource, such as a personal account at an online brokerage.

Because of the ability to store and exchange sensitive and personal information, Internet security has become a significant concern to individual users, software manufacturers and providers of Internet content.

One way in which Internet security is provided on the client side is via cross domain access rules, which generally ensure that for any received content, that content can only interact with content from the same web domain. For example, a typical page on www.1a2b.com can freely script content on any other page on www.1a2b.com, but cannot script to pages that are located on a different web domain. An enforcement mechanism ensures that only pages with identical domain properties are allowed to freely interact on the client side.

A relatively recent but common security problem is cross-site scripting. Cross-site scripting is a server-side vulnerability that enables malicious script (e.g., written by a hacker) to execute on a client machine. Such vulnerability allows an attacker to inject a piece of script (e.g., JavaScript) into a web page produced by a trusted web server. A browser executes the injected script as if it were provided by the server. Since the security restrictions of a browser are based on the origin of the web page, the script is executed by the browser under the same permission as the domain of the web application, bypassing the security restrictions.

For example, consider a web site that, after a user logs in, redirects the user to a welcome page that returns content based on information passed in the URL (e.g., www.1a2b.com/defaultasp?name=username) that when rendered at the client, greets the user by the username that was provided. However, if a script instead of the username is provided, vulnerable servers will pass back the script, and when the welcome page is rendered, the script will be executed on the client side. Thus, if a hacker tricks the user into clicking on a link to that site with a malicious script (instead of the username) sent to the server, such as www.1a2b.com/default.asp?name=<script>evilScript( )/script>, the web site passes back the script embedded into its content, as if it was the username.

When the browser interprets this part of the content as script, the browser automatically runs the script, which is normal browser behavior. However, because the script came from the web site, the script is able to instruct the browser to perform operations in that site's domain, including sending that site's cookie or cookies to another computer, such as the hacker's computer. In this manner, cross site-scripting can steal cookies, and thus a hacker can obtain a user's sensitive information. The problem is difficult to detect at both clients and servers, since servers often return content based on information passed with a URL, and clients often run scripts returned from a server.

Current web browser security models allow script executing on a web page to make HTTP (HyperText Transport Protocol) requests to interact with other HTTP resources on the same domain. If some of these resources require cookie-based authentication, it is possible for someone to stage a cross-site scripting attack to gain access to a victim's data as long as both resources are on the same domain.

One solution to the problem of cross-site scripting attacks includes generating a new publicly-accessible time-expiring URL (uniform resource locator) for each resource whenever it is needed instead of using cookies for authentication. However, this solution enables the URL to be given to unauthorized parties, who then have temporary access to the resource before the URL expires. Another solution involves using a different domain for every resource owner. For example, a script on alice.server.com cannot communicate with bob.server.com. But here too, the cross-site scripting attack problem can still exist when multiple resources within the same subdomain have different access control lists. And using a different domain for every resource suffers from being overly restrictive—no script is able to make HTTP requests to other resources, even when desired.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for reducing the occurrence of harmful cross-site scripting is provided by segregating on-line content or other resources so that they are accessible at different domains or subdomains, each of which corresponds to a set of users, called a "sharing set," where each user in the set has identical access privileges to certain resources. The sharing set is provided with an identifier (which may or may not be unique), so that the identifier may be used as the name of the domain or subdomain for which any member of the sharing set is authorized to access the resources located there. In this way, script that is embedded with the content can only be executed among members of the sharing set. Users who are not members of the sharing set are unable to invoke cross site-scripting attacks that would allow them to gain access to data from sharing set members.

In various illustrative examples, a unique identifier is assigned to a sharing set and used as a subdomain name so that HTTP resources may be segregated within subdomains that correspond to a given sharing set. The sharing set identifier may optionally be hashed. An encrypted version of the sharing set identifier (or hashed identifier) may be stored as a token in a path part of the URL for a resource to efficiently validate the sharing set subdomain. And, calls from authorized callers made to non-segregated (i.e., un-protected) domains may be redirected to the appropriate segregated domain.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
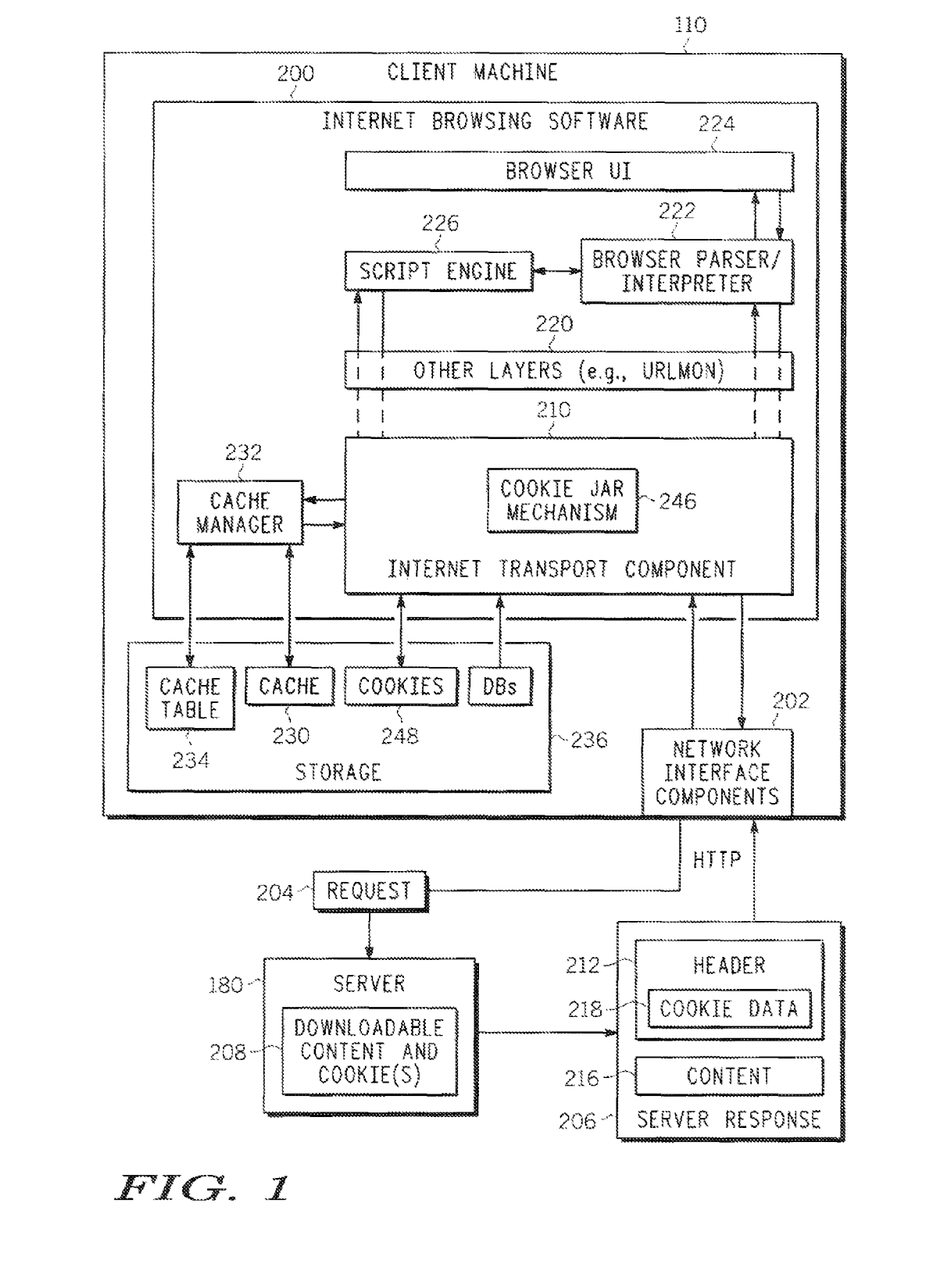
FIG. 1 is a simplified block diagram of an illustrative client-server environment that shows components of a client computer on which browsing software is executed and a server that may be used to host an on-line storage service.

Turning now to the drawings, FIG. 1 is a block diagram of the pertinent components of a client computer 110, on which browsing software 200 is executed, and a server 180 that may be used to host an on-line storage service. The browsing software 200 communicates via a network interface software and hardware unit 202 with remote server such as network server (or simply "server") 180. The communication may include requests for content (e.g., HTTP "GET" requests) such as the request 204, and result in responses such as the response 206 being received from the server 180. Communication between the client computer 110 and the server 180 typically uses a network protocol, such as HTTP.

The server 180 maintains content items and cookies at network locations, shown in FIG. 1 as the block labeled 208.

Network servers may thus include HTTP web sites, including those having sites with different names (which may be regarded as different virtual servers even if they are hosted on the same physical machine). Note that a web site may be distributed over many virtual servers, which in turn may be distributed over many physical machines.

As further shown in FIG. 1, an internet transport component or processor 210 (e.g., wininet.dll) handles much of the processing of the server's response 206. Part of the response 206 comprises one or more headers 212. The server response 206 may include the requested content 216 and/or cookie (data) 218, which may be located within the header 212.

When content 216 is returned, the content is passed from the internet transport component 210 (possibly through other layers of code 220) to browser parser/interpreter code 222 that parses and interprets the content for displaying to the user via a browser user interface 224. The browser parser/interpreter code 222 may invoke a script engine 226 as needed to interpret any script embedded in or referenced by the content.

Similar content also may be stored in a local cache 230 accessed via a cache manager 232 that is included in or otherwise associated with the internet transport component 210. For example, the cache manager 232 manages the cache by maintaining site-to-local-file mappings in a cache table 234 or the like, such that the content and related data may be locally accessed as appropriate. Note that although FIG. 1 shows a single storage unit 236 as maintaining the various data, it is emphasized that the data may be maintained in and/or distributed among separate storage units.

The internet transport component or processor 210 includes or is otherwise associated with a mechanism that stores and retrieves cookies, referred to as cookie jar mechanism 246. Although the cookie data 248 are maintained in the system storage unit 236, for simplicity the mechanism 246 (which executes in RAM) and stored cookie data 248 (which may reside in RAM, nonvolatile storage or a combination of both) may be together considered as a cookie jar.

Cross site scripting may occur when the browser parser/interpreter 222 invokes the script engine 226 to interpret malicious script. The malicious script may be used, for example, by a hacker to acquire cookie data 248 associated with the domain from which the malicious script was received. As previously mentioned, cross site scripting problems can be mitigated by storing or otherwise locating on-line resources at domains or subdomains that correspond to sets of authorized users who have the same level of access to the resources. In this way users who are not members of the group cannot cause cross site-scripting attacks that would allow them to gain access to cookies or other sensitive information from the members of the group.

This arrangement can be illustrated with reference to FIG. 2A, which shows a caller 310 (e.g., client computer 110 shown in FIG. 1) who wishes to upload various resources such as content files or items to an on-line storage service. The on-line storage service may include one or more real or virtual servers, the latter of which may be web sites with different addresses or subdomains that are hosted on the same physical machine. It should be noted that a web site may be distributed over many virtual servers, which in turn may be distributed over many physical machines. In the particular example shown in FIG. 2A and the drawings that follow, a storage service 320 (e.g., hosted by the remote server 180 shown in FIG. 1) and a backing store 330 are utilized. As noted, the storage service 320 and the backing store 330 may reside on the same or different machines or systems.

In this example, the caller 310 uploads three resources for storage with the on-line storage service. In this case, the resources are the three files resume.tex, photos.zip, and report.txt. The three files may be uploaded in a single transaction or in two or three separate transactions. For each file, the caller 310 can specify an access control list ("ACL") in the form of metadata. Instead of specifying the ACL for each and every file the ACL set can be established once within a parent container in the hierarchy, in which case every uploaded file inherits its parent's ACL unless it is overridden.

The ACL specifies a set of callers having identical access privileges with respect to each of the files. In this example, the files report.txt and photos.zip share the same ACL, which as shown in FIG. 2A, includes the set of members {Alice, Bob}. Likewise, the file resume.tex has an ACL that specifies the set of members {Bob, Eve}. As indicated at (1) in FIG. 2A, each file and its associated metadata (e.g., the ACL ID) is uploaded to the storage service 320. The storage service 320, in turn, directs the backing store 330 to store each file so that they can be accessed at a URL having a subdomain that is unique to each ACL or a representation thereof.

Figures 2A, 2B:
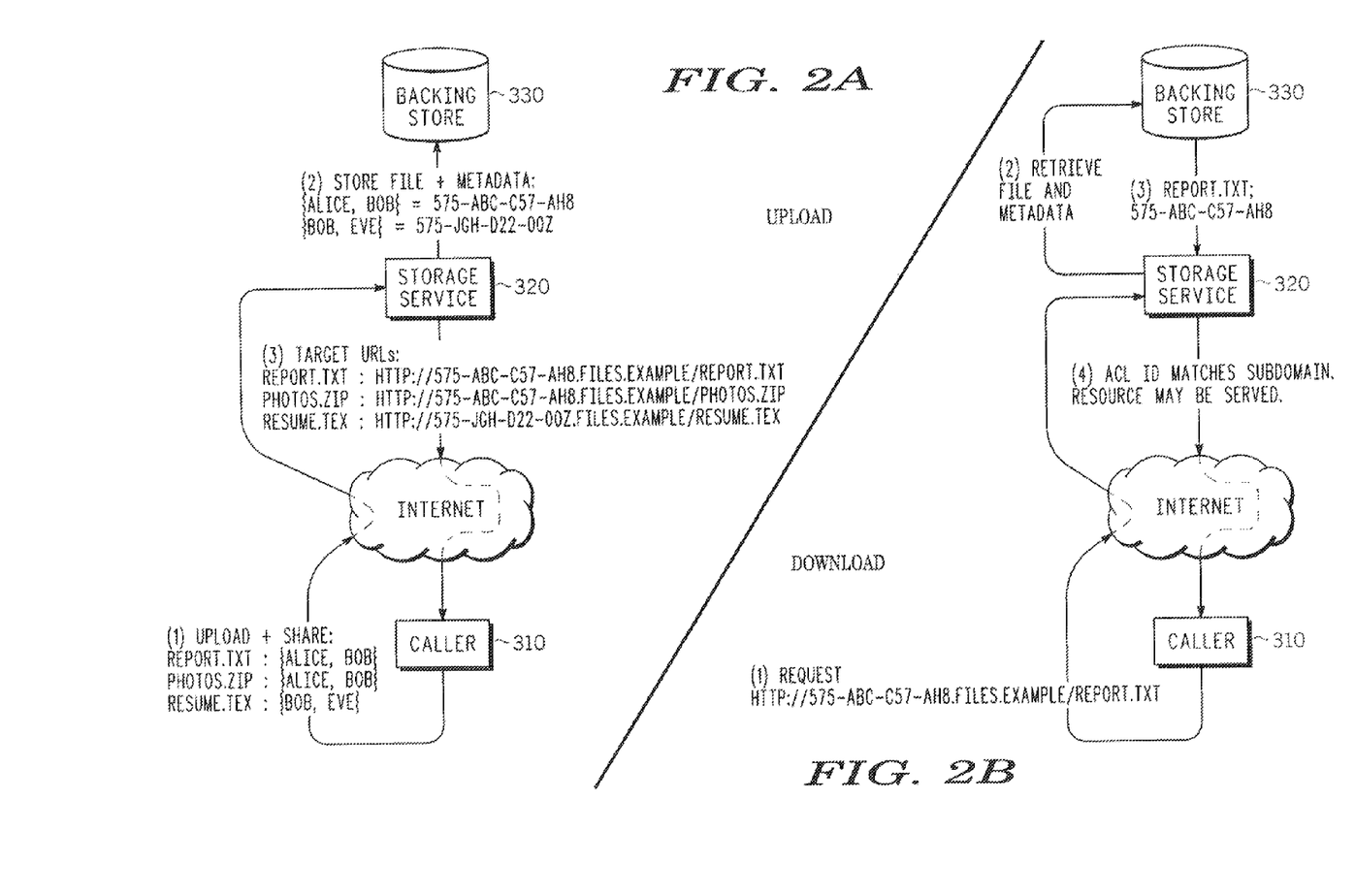
FIGS. 2A and 2B show an illustrative process by which a user uploads and downloads, respectively, a resource for storage to an on-line storage service that includes a storage service and a backing store.

For example, as indicated at (2) in FIG. 2A, the subdomain associated with the ACL {Alice, Bob} may be 575-abc-c57-ah8.files.example and the subdomain associated with the ACL {Bob, Eve} may be 575-jgh-d22-00z.files.example. Thus, the files report.txt and photos.zip may be accessed at the URLs http://575-abc-c57-ah8.files.example/report.txt and http://575-abc-c57-ah8.files.example/photos.zip, respectively. The file resume.tex may be accessed at the URL http://575-jgh-d22-00z.files.example/resume.tex. As indicated at (3) in FIG. 2A, these URLs are forwarded by the storage service 320 on storage service to the caller 310.

FIG. 2B shows an illustrative process that may be performed when a caller attempts to access one of the files (i.e., report.txt) that was uploaded in FIG. 2A. As shown at (1), the caller's browser requests the URL http://575-abc-c57-ah8.files.example/report.txt, which is linked to the file report.txt. Under the direction of storage service 320 running on the storage service, at (2) the backing store 330 retrieves the file report.txt and the associated metadata, which in this case is the ACL ID that identifies the set of authorized callers {Bob, Eve} is retrieved from the backing store 330. The file and the metadata are forwarded to the storage service 320 at (3) in FIG. 2B. The storage service 320 then compares the ACL ID of the caller with the ACL ID associated with the requested file. If they match, indicating that the caller is a member of the group allowed to access the file, the requested file is forwarded to the caller at (4).

The domain or subdomain names that are associated with the ACLs or a representation of the ACL may be generated in any manner that is desired. For example, the subdomain name may be a concatenation of the ACL ID and the user ID of the user who originally uploaded or owns the on-line resource. However, the explicit use of the ACL ID can in some cases lead to long, unwieldy subdomains and could potentially expose sensitive data, depending on the particular user ID and ACL ID. These problems can be mitigated by using as the subdomain name a hash of the ACL ID. Such an arrangement is illustrated in FIGS. 3A and 3B.

Figures 3A, 3B:
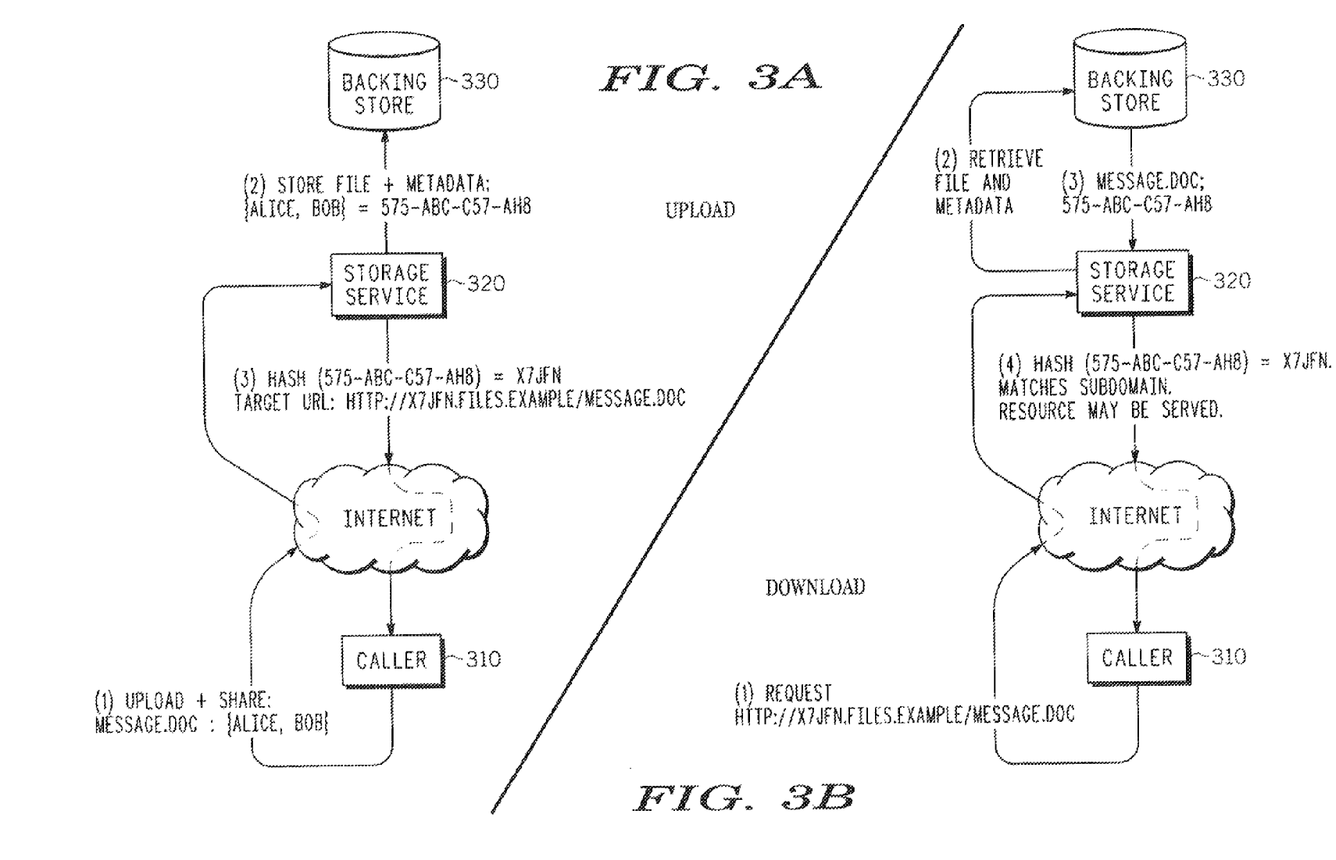
FIGS. 3A and 3B show another illustrative process by which a user uploads and downloads, respectively, a resource for storage to an on-line storage service that includes a storage service and a backing store.

In the example shown in FIG. 3A, a caller 310 is uploading the file message.doc, which, as indicated at (1), has an ACL that includes the members {Alice, Bob}. The ACL ID associated with the ACL {Alice, Bob} is 575-abc-c57-ah8. As shown at (2), the file message.doc and the ACL ID are stored in the backing store 330. The storage service 320 calculates the hash of the ACL ID 575-abc-c57-ah8, which in this example is x7jfn, and uses this as the subdomain name at which the file can be located. The complete URL at which the file can be located, http://x7jfn.files.example/message.doc, is then forwarded to the caller 310.

FIG. 3B shows an illustrative process that may be performed when a user attempts to access the file message.doc that was uploaded in FIG. 3A. As shown at (1), the user's browser requests the URL http://x7jfn.files.example/message.doc, which is linked to the file message.doc. Under the direction of the storage service 320, at (2) the backing store 330 retrieves the file message.doc and the associated metadata, (which in this case is the ACL ID 575-abc-c57-ah8), which identifies the set of authorized users {Alice, Bob}. The file and the metadata are forwarded to the storage service 320 at (3) in FIG. 2B. The storage service 320 then calculates the hash of the ACL ID and compares it with the subdomain of the URL requested by the caller 310. If they match, indicating that the caller is a member of the group allowed to access the file, the requested file is forwarded to the caller at (4).

Since the steps employed to generate and validate the subdomain based on the ACL ID may be expensive, the URL may contain an encrypted version of the subdomain or the hash of the subdomain. In this case the storage service 320 only needs to confirm that the subdomain of the requested URL matches the subdomain that has been encrypted. Such an arrangement is shown in the example of FIGS. 4A and 4B.

Figures 4A, 4B:
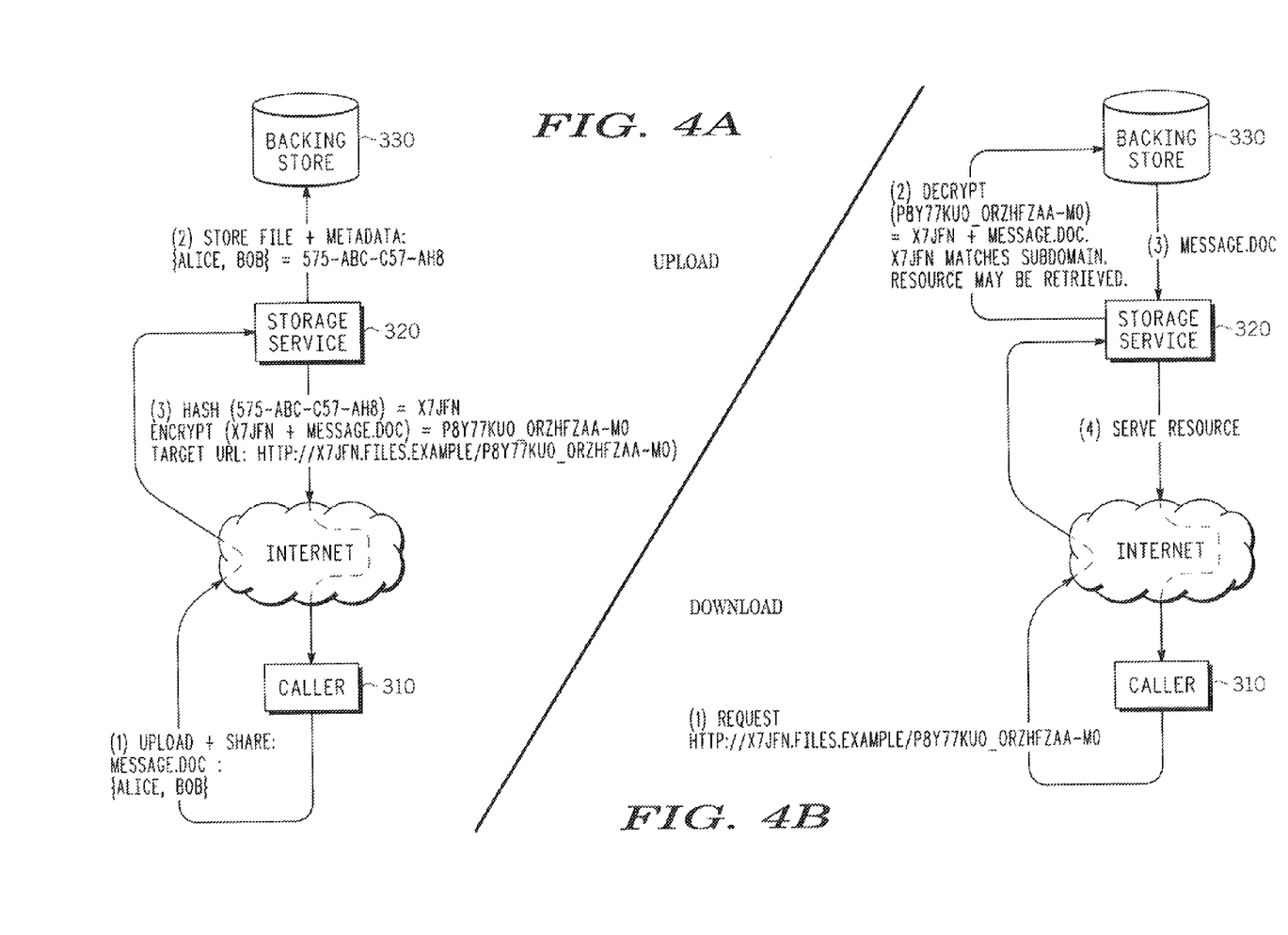
FIGS. 4A and 4B show another illustrative process by which a user uploads and downloads, respectively, a resource for storage to an on-line storage service that includes a storage service and a backing store.

In the example shown in FIG. 4A, a caller 310 is uploading the file message.doc, which, as indicated at (1), has an ACL that includes the members {Alice, Bob}. The ACL ID associated with the ACL {Alice, Bob} is 575-abc-c57-ah8. As shown at (2), the file message.doc and the ACL ID are stored in the backing store 330.

The storage service 320 calculates the hash of the ACL ID 575-abc-c57-ah8, which in this example is x7jfn, and then encrypts the hash and the file name. Both the hash and the encrypted hash and file are used in the URL at which the file can be located. The complete URL at which the file can be located, http://x7jfn.files.example/p8y77kUo_orZhfzAAm0/message.doc, is then forwarded to the caller 310.

FIG. 4B shows an illustrative process that may be performed when a user attempts to access the file message.doc that was uploaded in FIG. 4A. As shown at (1), the user's browser requests the URL http://x7jfn.files.example/p8y77kUo_orZhfzAA-m0/message.doc, which is linked to the file message.doc. The storage service 320, at (2) decrypts the URL and verifies that the subdomain x7jfn matches the subdomain encoded in the metadata associated with the requested file, and directs the backing store 330 to retrieve the file (but not the metadata). The file is forwarded to the storage service 320 at (3) in FIG. 4B and the storage service 320 sends it to the caller 310 at (4).

Figure 5:
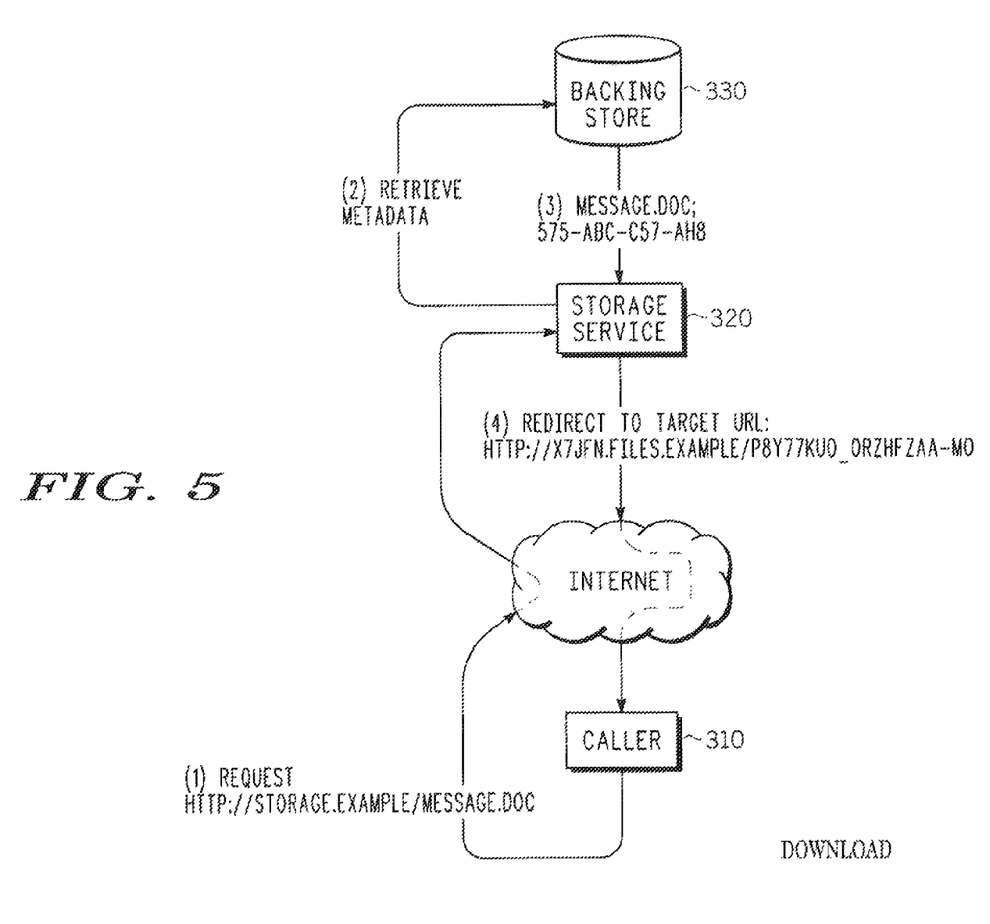
FIG. 5 shows an illustrative process by which a call to an unprotected, non-segregated domain is redirected to a restricted, segregated domain.

In general the subdomain, and hence the full URL cannot be determined by the end user a priori. In some cases, the user may first direct the request to a URL on an unprotected, non-segregated subdomain. When the storage service receives the request, the caller is redirected to a URL on the restricted, segregated subdomain. FIG. 5 shows such an arrangement in which a user wishes to access the file message.doc. In this case, at (1) the caller requests the file from the storage service using the trusted subdomain storage.example. That is, the caller's browser requests the URL http://storage.example/message.doc.

At (2), the backing store 330 retrieves the metadata and at (3) returns it to the storage service 320. Using the metadata, the storage service 320 constructs a URL on a restricted subdomain. In this case the URL is calculated in the manner presented above in connection with FIGS. 4A and 4B. That is, the URL is http://x7jfn.files.example/p8y77kUo_orZhfzAAm0/message.doc. The storage service 320 then returns this URL to the caller so that the user can access the file using the techniques described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processors that when executing instructions are configured to:
   receive a request for a resource from a caller;
   based at least in part on determining that the request is directed to a first uniform resource locator (URL) comprising a non-segregated sub-domain, redirect the request to a second URL comprising a segregated sub-domain and a path part, the path part comprising an encryption based at least in part on an identifier that corresponds to a sharing set of callers authorized to access the resource;
   decrypt the path part to determine the identifier; and
   based at least in part on determining that the identifier matches the segregated sub-domain, provide the resource to the caller.

2. The system of claim 1, the segregated sub-domain different than the path part.

3. The system of claim 1, the identifier comprising at least one of a hash or token.

4. The system of claim 1, the encryption based at least in part on a name of the resource.

5. The system of claim 1, the one or more processors configured to provide one or more users of the sharing set with identical access privileges to the resource.

6. The system of claim 1, the sharing set associated with an access control list (ACL).

7. The system of claim 6, the ACL inherited from a parent container.

8. The system of claim 1, the first URL different than the second URL.

9. The system of claim 1, the request comprising a HyperText Transport Protocol request.

10. The system of claim 1, the sharing set comprising a set of users.

11. A method, comprising:
    receiving a request for a resource from a caller, the request directed to a second uniform resource locator (URL) comprising a segregated sub-domain and a path part;
    decrypting the path part to determine an identifier that corresponds to a sharing set of callers authorized to access the resource; and
    based at least in part on determining that the identifier matches the segregated sub-domain, providing the resource to the caller, at least some of the method implemented at least in part via a processor.

12. The method of claim 11, the identifier comprising at least one of a hash or token.

13. The method of claim 11, the sharing set associated with an access control list (ACL).

14. The method of claim 11, the request comprising a HyperText Transport Protocol request.

15. The method of claim 11, the sharing set comprising a set of users.

16. The method of claim 13, the ACL inherited from a parent container.

17. A computer-readable storage unit comprising computer-executable code, which when executed via a processor on a computer perform acts, comprising:
    receiving a request to upload a resource from a caller;
    based at least in part on receiving the request, encrypting an identifier that corresponds to a sharing set of callers authorized to access the resource to generate an encryption; and
    providing a second uniform resource locator (URL) for accessing the resource once uploaded, the second URL comprising a segregated sub-domain and a path part, the path part comprising the encryption.

18. The computer-readable storage unit of claim 17, the encrypting comprising encrypting the identifier and a name of the resource to generate the encryption.

19. The computer-readable storage unit of claim 17, the request comprising an indication of the sharing set.

20. The computer-readable storage unit of claim 17, the identifier matching the segregated sub-domain.

* * * * *